US012006762B2

(12) United States Patent
Bhandari et al.

(10) Patent No.: US 12,006,762 B2
(45) Date of Patent: Jun. 11, 2024

(54) VACUUM INSULATED GLAZING, VALVE, FLEXIBLE SEAL, AND METHOD FOR MAKING VACUUM INSULATED GLAZING

(71) Applicant: UT-BATTELLE, LLC, Oak Ridge, TN (US)

(72) Inventors: Mahabir Bhandari, Knoxville, TN (US); Ahmed A. Hassen, Knoxville, TN (US); Bipin Shah, Fairfax, VA (US); Derek Byrd, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 3 days.

(21) Appl. No.: 17/570,931

(22) Filed: Jan. 7, 2022

(65) Prior Publication Data

US 2022/0228426 A1 Jul. 21, 2022

Related U.S. Application Data

(60) Provisional application No. 63/138,948, filed on Jan. 19, 2021.

(51) Int. Cl.
*E06B 3/66* (2006.01)
*E06B 3/663* (2006.01)
(Continued)

(52) U.S. Cl.
CPC ........ *E06B 3/6612* (2013.01); *E06B 3/66333* (2013.01); *E06B 3/67326* (2013.01);
(Continued)

(58) Field of Classification Search
CPC ............... E06B 3/6612; E06B 3/66333; E06B 3/67326; E06B 3/6775; E06B 3/66314;
(Continued)

(56) References Cited

U.S. PATENT DOCUMENTS 4,113,905 A * 9/1978 Kessler ............... E06B 3/66314
52/786.13
4,300,601 A * 11/1981 Steinberg ............... F24S 80/54
141/94
(Continued)

FOREIGN PATENT DOCUMENTS

EP 0054251 A1 * 6/1982
JP 03039590 A * 2/1991
(Continued)

OTHER PUBLICATIONS https://www.glassonweb.com/article/vacuum-insulating-glass-past-present-and-prognosis, Mar. 20, 2019.
(Continued)

*Primary Examiner* — Theodore V Adamos
(74) *Attorney, Agent, or Firm* — Fox Rothschild LLP

(57) ABSTRACT

A vacuum insulated glazing includes first and second spaced apart glass panes having perimeter portions defining a vacuum space between the glass panes. A vacuum valve is positioned at the perimeter portions of the glass panes and includes a valve body extending between the perimeter portions of the glass panes, and having first and second ends and a fluid conduit extending from the first end to the second end of the valve body and in fluid communication with the vacuum space. A one-way valve in the fluid conduit permits fluid flow from the vacuum space, and prevents fluid flow into the vacuum space. A suction fitting is provided for connecting the valve body to a suction device. An end seal between the perimeter portions of the glass panes is provided for hermetically sealing the vacuum space. A valve for a VIG and a method of making a VIG are also disclosed.

8 Claims, 14 Drawing Sheets

(51) Int. Cl.
  *E06B 3/673* (2006.01)
  *E06B 3/677* (2006.01)
  *F16K 15/04* (2006.01)

(52) U.S. Cl.
  CPC ........ *E06B 3/6775* (2013.01); *E06B 3/66342* (2013.01); *F16K 15/04* (2013.01)

(58) Field of Classification Search
  CPC .......... E06B 3/66352; Y10T 137/7873; Y02B 80/22; F16K 15/04; Y02A 30/249
  See application file for complete search history.

(56) References Cited

U.S. PATENT DOCUMENTS

| | | | |
|---|---|---|---|
| 6,823,644 B1 * | 11/2004 | Peterson | E06B 3/66314 52/786.13 |
| 8,595,994 B1 * | 12/2013 | Grommesh | E06B 3/66304 52/204.593 |
| 10,443,299 B1 * | 10/2019 | Chin | E06B 3/6612 |
| 2010/0031943 A1 * | 2/2010 | Kirouac | F41B 11/724 124/80 |

FOREIGN PATENT DOCUMENTS

| | | | |
|---|---|---|---|
| KR | 20070073541 A | * | 7/2007 |
| KR | 20190115797 A | * | 10/2019 |

OTHER PUBLICATIONS https://abbess.com/vacuum/high-vacuum-chambers; 2016.
Thermo Scientific Vacuum Ovens brochure, 2017.

\* cited by examiner

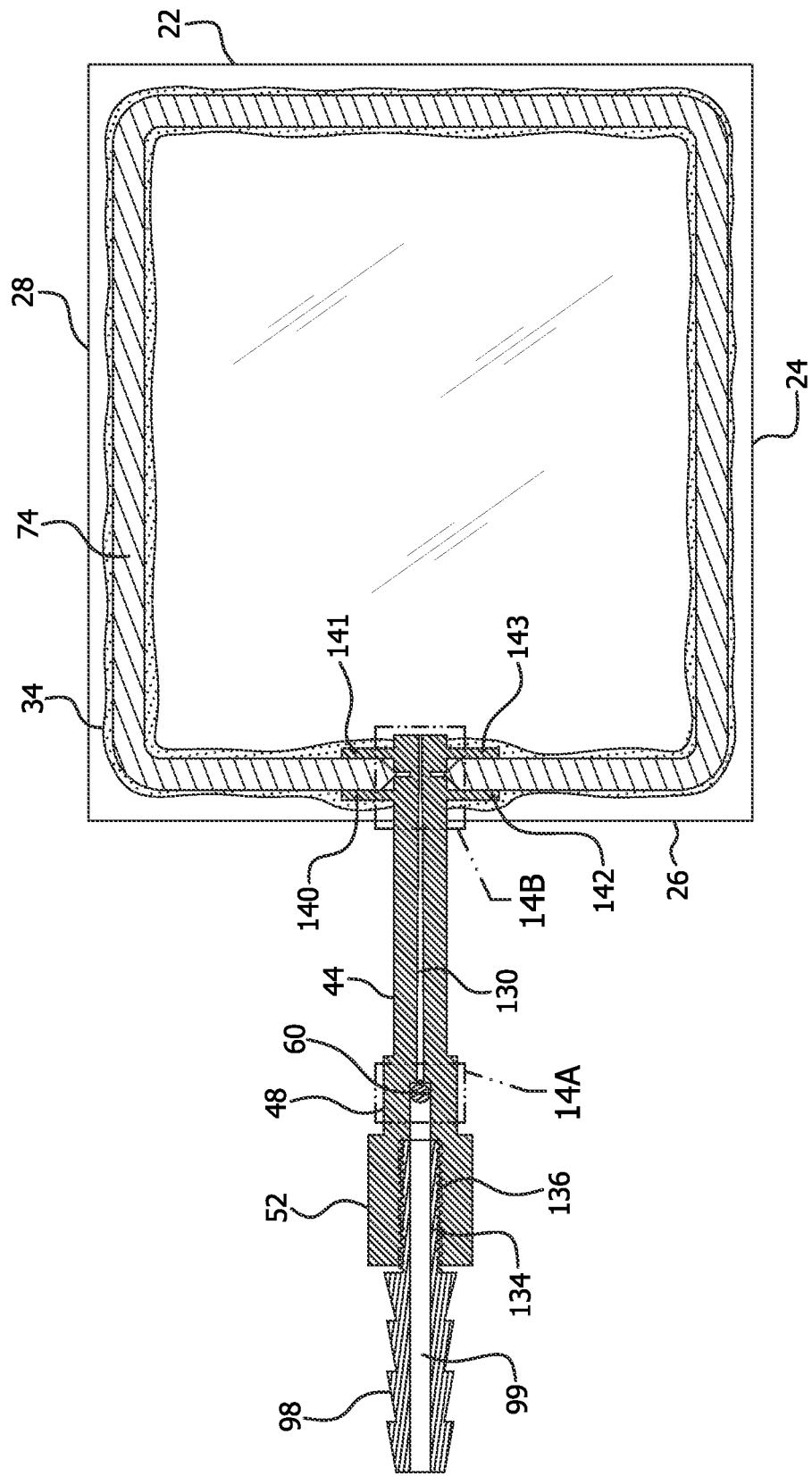

VACUUM INSULATED GLAZING, VALVE, FLEXIBLE SEAL, AND METHOD FOR MAKING VACUUM INSULATED GLAZING

CROSS-REFERENCE TO RELATED APPLICATIONS

This application claims priority to U.S. 63/138,948 filed on Jan. 19, 2021, entitled "Pulse Strengthened and Laser Edge Fused Sealed Vacuum Insulation Glazing (VIG)", the entire disclosure of which incorporated herein by reference.

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in this invention.

FIELD OF THE INVENTION

The present invention relates generally to vacuum insulated glazing, and more particularly to methods and systems for making vacuum insulated glazing.

BACKGROUND OF THE INVENTION

Vacuum insulated glazing (VIG) is a highly thermally insulated window technology that provides superior insulation compared to most current window technologies. Vacuum insulated glazing is generally constructed of a minimum of two glass panes with an enclosed, highly evacuated cavity between the panes which serves as a vacuum space. A high vacuum (below 0.001 torr) allows for near zero heat conduction and convection, making it ideal insulation. Heat transfer through radiation is still a possibility in the vacuum space, however there are many different options for low emittance (low-E) coatings that reduce radiation transmittance between glass. Producing and maintaining a vacuum between two panes of glass presents some design challenges.

First of the addressed challenges is supporting the glass while retaining the low-conductivity. As a vacuum is created, atmospheric pressure on the glass will deform it. If the glass deforms significantly, the two panes may touch, producing a conduction path. To prevent this, supports such as pillars and spacers are placed in a regular grid between the two panes of glass, for example every 2" or less, so up to 0.04" gap between panes can be supported without contact. There are several options for making these supports. Different options are available for making the support materials between the glass less visible, stronger, and more insulating.

Second of the challenges is making an edge seal between the panes of glass that will hold a vacuum for the 20+ year lifespan of VIG. Due to the potential temperature differential between the inside and the outside of the VIG, thermal stress can be developed within the edge seal material resulting in the failure of the edge seal and thus the loss of vacuum. Current technologies for addressing this challenge are flexible edge seal, low thermal-budget laser-assisted hermetic sealing etc., thus eliminating a thermo-compression step which requires high temperature processing. The use of fused glass as an edge seal can create a bond which is able to resist the thermal stress due to having the same thermal expansion properties. In this manner, thermal stress, which is the common cause of edge seal failure in conventional VIG technology, can be reduced.

The third of the addressed challenges is providing a vacuum valve built into the VIG to allow the vacuum to be created during some stage of, or after, assembly. In conventional technologies it is done by machining a countersink in one of the glass panes, then using a device to create a vacuum through the hole before pressing an indium sphere into the countersink, sealing it. However, this creates localized stress, a cause of VIG failure, and the valve is exposed within the glazing vision of the window.

SUMMARY OF THE INVENTION

A vacuum insulated glazing includes first and second spaced apart glass panes having perimeter portions. The glass panes define a vacuum space between the glass panes. A vacuum valve is positioned at the perimeter portions of the glass panes. The vacuum valve includes a valve body. A portion of the valve body extends between the perimeter portions of the glass panes. The valve body has first and second ends and a fluid conduit having corresponding first and second ends and extending from the first end to the second end of the valve body. The first end of the fluid conduit is in fluid communication with the vacuum space. A one-way valve in the valve body is positioned between the first end and the second end of the fluid conduit. The one-way valve permits fluid flow in the fluid conduit from the first end to the second end, and prevents fluid flow from the second end to the first end of the fluid conduit. A suction fitting is provided for connecting the valve body to a suction device in fluid communication with the second end of the fluid conduit. An end seal is provided between the perimeter portions of the glass panes for hermetically sealing the vacuum space. Suction when applied to the suction fitting will draw a gas from the vacuum space through the first end of the fluid conduit, through the one-way valve and the second end of the fluid conduit to create a vacuum in the vacuum space, and the one-way valve will prevent the passage of the gas into the vacuum space so as to maintain the vacuum in the vacuum space.

The fluid conduit at the first end can be smaller in cross section than at the second end. The fluid conduit can be conical. The one-way valve can include a movable valve member in fluid conduit. The valve member can have first and second positions in the fluid conduit. The valve member in the first position prevents fluid flow through the conduit, and in the second position permits fluid flow through the conduit. The valve member can be a spherical ball. A restricting member can be provided for preventing movement of the valve member through the second end of the fluid conduit.

A sealing member can be provided for attaching to the valve body and hermetically sealing the fluid conduit. The valve body can be rectangular in cross section and can have a height dimensioned to fit between the spaced apart glass panes. The suction fitting can be detachable from valve body. The vacuum insulated glazing can further include spacers extending between the glass panes and through the vacuum space.

The end seal can include an end seal member having free ends. The valve body can have channel members for positioning and securing the free ends of the end seal member. The valve body can have depressions for receiving free end portions of the end seal members.

A method of making a vacuum insulated glazing can include the step of providing first and second spaced apart glass panes having perimeter portions, the glass panes defining a vacuum space between the glass panes. A vacuum valve is positioned at the perimeter portions of the glass panes, the vacuum valve comprising a valve body, a portion of the valve body extending between the perimeter portions of the glass panes. The valve body has first and second ends and a fluid conduit having corresponding first and second ends and extending from the first end to the second end of the valve body. The first end of the fluid conduit is in fluid communication with the vacuum space. A one-way valve in the valve body is positioned between the first end and the second end of the fluid conduit. The one-way valve permits fluid flow in the fluid conduit from the first end to the second end, and prevents fluid flow from the second end to the first end of the fluid conduit. A suction fitting provided at or attached to the second end of the valve body is used to connect the valve body to a suction device in fluid communication with the second end of the fluid conduit.

An end seal metallic barrier is positioned and attached between the perimeter portions of the glass panes to hermetically seal the vacuum space. A suction source is connected to the suction fitting and suction is applied to withdraw a gas from the vacuum space through the fluid conduit to create a vacuum in the vacuum conduit. The suction is stopped and the suction source is removed from the suction fitting, whereby the one-way valve will prevent the flow of air through the vacuum conduit into the vacuum space.

The method can further include the step of attaching a sealing member to the valve body to hermetically seal the fluid conduit. The method can further include the step of removing a portion of the valve body extending beyond the perimeter portion of the glass panes prior to attaching the sealing member.

A vacuum valve for vacuum insulated glazing has first and second spaced apart glass panes with perimeter portions, the glass panes defining a vacuum space between the glass panes. The vacuum valve includes a valve body, a portion of the valve body dimensioned to extend between the perimeter portions of the glass panes. The valve body has first and second ends and a fluid conduit has corresponding first and second ends extending from the first end to the second end of the valve body. The first end of the fluid conduit can be used for establishing a fluid communication with the vacuum space. A one-way valve in the valve body is positioned between the first end and the second end of the fluid conduit. The one-way valve permits fluid flow in the fluid conduit from the first end to the second end, and prevents fluid flow from the second end to the first end of the fluid conduit. A suction fitting is provided for attaching the second end of the valve body to a suction source in fluid communication with the second end of the fluid conduit. Suction when applied to the suction fitting will draw a gas from the vacuum space through the first end of the fluid conduit and through the one-way valve to the second end of the fluid conduit and through the suction passage, and the one-way valve will prevent the passage of the gas into the vacuum space so as to maintain a vacuum in in the vacuum space.

The fluid conduit at the first end can be smaller in cross section than at the second end. The fluid conduit can be conical. The one-way valve can include a movable valve member in fluid conduit. The valve member has first and second positions in the fluid conduit. The valve member in the first position prevents fluid flow through the conduit, and in the second position permits fluid flow through the conduit. The valve member can be a spherical ball. A restricting member can be provided for preventing movement of the valve member through the second end of the fluid conduit.

A sealing member can attach to the valve body and hermetically sealing the fluid conduit. The sealing member can be a sealing cap for sealing the second end of the fluid conduit. The suction fitting can be detachable from the valve body and can include a suction passage for establishing a fluid connection with the second end of the fluid conduit. Vacuum insulated glazing can include first and second spaced apart glass panes having perimeter portions and defining a vacuum space between the glass panes, and the valve body can be dimensioned to fit between the perimeter portions of the glass panes.

BRIEF DESCRIPTION OF THE DRAWINGS

There are shown in the drawings embodiments that are presently preferred it being understood that the invention is not limited to the arrangements and instrumentalities shown, wherein:

FIG. 14 is a cross section of a VIG and a vacuum valve assembly.

DETAILED DESCRIPTION OF THE INVENTION

Figure 1:
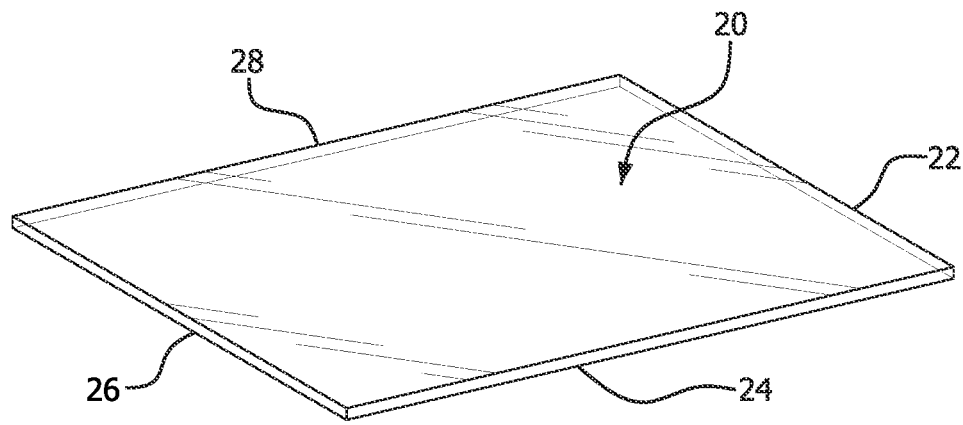
FIG. 1 is a perspective view of VIG, in a first stage of assembly.

A vacuum insulated glazing according to the present invention includes first and second spaced apart glass panes having perimeter portions. A vacuum space is between the glass panes. A vacuum valve is positioned at the perimeter portions of the glass panes. The vacuum valve includes a valve body. A portion of the valve body extends between the perimeter portions of the glass panes. The valve body has first and second ends. A fluid conduit has corresponding first and second ends and extends from the first end to the second end of the valve body. The first end of the fluid conduit is in fluid communication with the vacuum space. A one-way valve in the valve body is positioned between the first end and the second end of the fluid conduit. The one-way valve permits fluid flow in the fluid conduit from the first end to the second end, and prevents fluid flow from the second end to the first end of the fluid conduit. A suction fitting is provided for connecting the valve body to a suction device in fluid communication with the second end of the fluid conduit. An end seal between the perimeter portions of the glass panes is provided for hermetically sealing the vacuum space. Suction applied to the suction fitting will draw a gas from the vacuum space through the first end of the fluid conduit, through the one-way valve and the second end of the fluid conduit to create a vacuum in the vacuum space, and the one-way valve will prevent the passage of a gas such as air into the vacuum space so as to maintain the vacuum in the vacuum space.

The one-way valve can have many different constructions, such as biased flap valve members, rotating valve members, spring biased valve members, and other constructions. In one embodiment, the one-way valve has a movable valve member in the fluid conduit. The valve member has first and second positions in the fluid conduit, the valve member in the first position preventing fluid flow through the conduit, and in the second position permitting fluid flow through the conduit. The valve member can be a spherical ball. The fluid conduit can be shaped such that the ball or other valve member has a valve seat against which the valve member rests to close the conduit and prevent fluid flow from the second end to the first end of the conduit. The valve member is moved off of the valve seat by a reduction in pressure at the second end, as by the application of suction. A restricting member prevents movement of the valve member through the second end of the fluid conduit. The restricting member can be an obstruction such as a post, a protrusion or a screen which blocks escape by the spherical ball valve member while permitting gas to flow past the restriction. Other constructions for the one-way valve are possible.

The fluid conduit can have differing shapes, sizes and geometries. The fluid conduit can be circular in cross section or rectangular. In one embodiment, the fluid conduit at the first end is smaller in cross section than at the second end. The fluid conduit can be essentially a tapering, slightly conical shape such that a valve member in the shape of a spherical ball will seat against a portion of the cone having the same diameter to close the conduit against flow from the second end to the first end, and can move away from the valve seat when suction is applied.

The one-way valve will prevent the movement of gas (air) from the second end to the first end of the fluid conduit and thereby from the surroundings into the vacuum space, so as to preserve the vacuum within the vacuum space. The VIG must however maintain the vacuum for many years, preferably decades. It is therefore desirable to provide a secondary seal for the fluid conduit after the suction has been disconnected, which will additionally seal the fluid conduit. A sealing member can be provided for attaching to the valve body and hermetically sealing the fluid conduit. The sealing member can take varies forms. The sealing member can be a weld, plug or adhesive material that permanently fills and blocks the fluid conduit. The sealing member can be a cap which is attached over the valve body and secures and seals the fluid conduit. The cap can be secured by any suitable method including but not limited to welds, adhesives, threaded connections, and others.

The valve body can have different sizes, shapes and geometries. The portion of the valve body that extends between the perimeter portions of the glass panes will preferably be shaped and sized to closely fit this space, although various seats, mounts and bushings are possible to seal the space between the valve body and the glass panes. The valve body can be rectangular in cross section and have a height dimensioned to fit between the spaced apart glass panes. As the spacing between the glass panes can be quite small, such as 0.04" or less, the valve body can have at least a portion which is dimensioned to fit in this gap between the perimeter portions.

A suction device is attached to the valve body to withdraw gas through the fluid conduit and form the vacuum in the vacuum space. The valve body can be provided with a suction fitting for this purpose. The suction fitting can be any suitable structure that is sized and shaped to mate with a corresponding suction device attached to a suction source such as a vacuum pump. The suction fitting portion can be detachable and can be a threaded fitting, a snap fitting, or a seat for a suction hose that is secured with a hose clamp of some kind. In one embodiment, the suction fitting is barbed for attaching to a flexible hose that is pushed over the barbs, as is common in fluid handling systems. The suction fitting portion of the valve body can be detachable from the rest of the valve body after use, such that the suction fitting will not protrude and interfere with the installation of the VIG in a window or door frame assembly.

The vacuum insulated glazing can be made of any suitable window glass material including mixtures of materials. It is desirable to provide supports between the glass panes to prevent the glass contact/collapse due to the stress that would otherwise be placed on the glass panes by the difference in pressure between the vacuum space and the ambient air. Supports made of metal or ceramic material can extend between the glass panes and through the vacuum space to provide this support.

The invention can be used with different end seals. End seals of differing constructions and materials are known in the VIG art. The end seal members proposed in this invention can be made of polymeric materials and/or metals or combination of both that can form hermetic and durable seals, and are preferably metallic materials with low heat conductivity such as titanium and alloys thereof. The end seal members are attached and sealed to the glass panes by known methods and materials such as adhesives. Any suitable such end seal construction and material can be used. It is necessary that the end seal material is sealed against the valve body to ensure that the connection is hermetic and does not permit the entry of air into the vacuum space or result in outgassing. This can be accomplished by the provision of suitable metal structure, such as wire, which does not allow outgassing or diffusion of gas into the vacuum space, for securing the end seal to the vacuum body. This structure can form a barrier, such as a metal wire, along the perimeter of the vacuum space. Adhesive can be placed to adhere the wire. The vacuum body can also be provided with channel members for receiving, positioning and securing the free ends of the end seal members.

A method of making a vacuum insulated glazing can include the steps of providing first and second spaced apart glass panes having perimeter portions, the glass panes defining a vacuum space between the glass panes. A vacuum valve is positioned at the perimeter portions of the glass panes. The vacuum valve includes a valve body. A portion of the valve body extends between the perimeter portions of the glass panes. The valve body has first and second ends and a fluid conduit having corresponding first and second ends which extend from the first end to the second end of the valve body. The first end of the fluid conduit is in fluid communication with the vacuum space. A one-way valve in the valve body is positioned between the first end and the second end of the fluid conduit. The one-way valve permits fluid flow in the fluid conduit from the first end to the second end, and prevents fluid flow from the second end to the first end of the fluid conduit. A suction fitting is provided at the second end of the valve body for connecting the valve body to a suction device in fluid communication with the second end of the fluid conduit. An end seal is positioned and attached between the perimeter portions of the glass panes to hermetically seal the vacuum space. A suction source is connected to the suction fitting. Suction is applied to withdraw a gas from the vacuum space through the fluid conduit to create a vacuum in the vacuum conduit. The suction is stopped, and the suction source is removed from the suction fitting, whereby the one-way valve will prevent the flow of air through the vacuum conduit into the vacuum space.

The method can further include the step of attaching a sealing member to the valve body to hermetically seal the fluid conduit. This can be accomplished by suitable adhesives or methods such as welding. The method can include the step of removing a portion of the valve body extending beyond the perimeter portion of the glass panes prior to attaching the sealing member.

Suction devices of different kinds and constructions can be used with the method of the invention. The device can be pumps of different sizes, styles and constructions, and are known in the VIG art.

The valve can be made by different methods including injection molding and additive manufacturing methods. Additive manufacturing methods are useful because of the very small size of the valve body. The spherical ball valve member can be positioned in the fluid conduit and thereafter the restricting member can be positioned to prevent the spherical ball valve member from escaping the fluid conduit.

Figure 2:
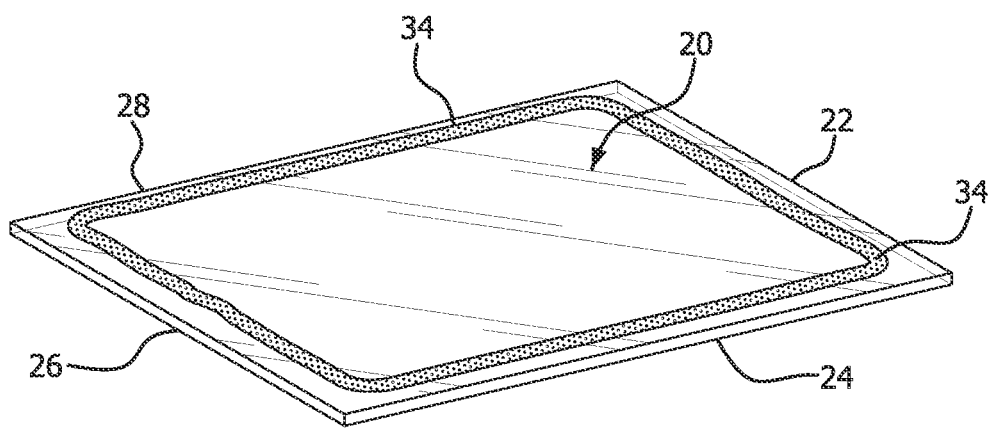
FIG. 2 is a perspective view of VIG, in a second stage of assembly.
Figure 3:
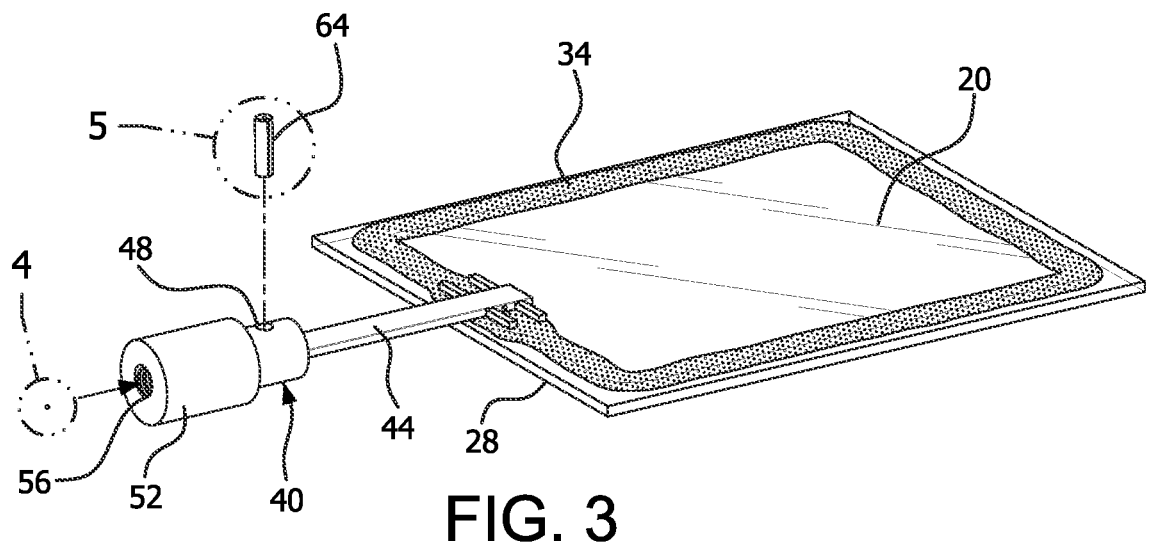
FIG. 3 is an exploded perspective view of VIG, in a third stage of assembly.
Figure 4:
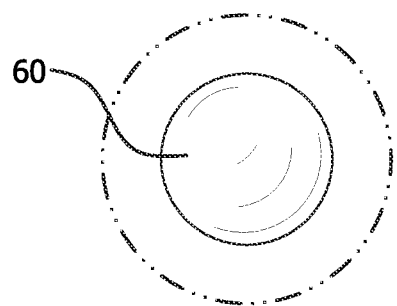
FIG. 4 is a side elevation of a spherical ball valve member.
Figure 5:
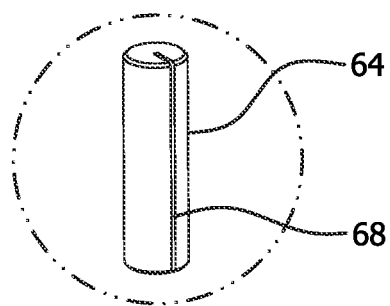
FIG. 5 is a perspective view of a restricting member.
Figure 15:
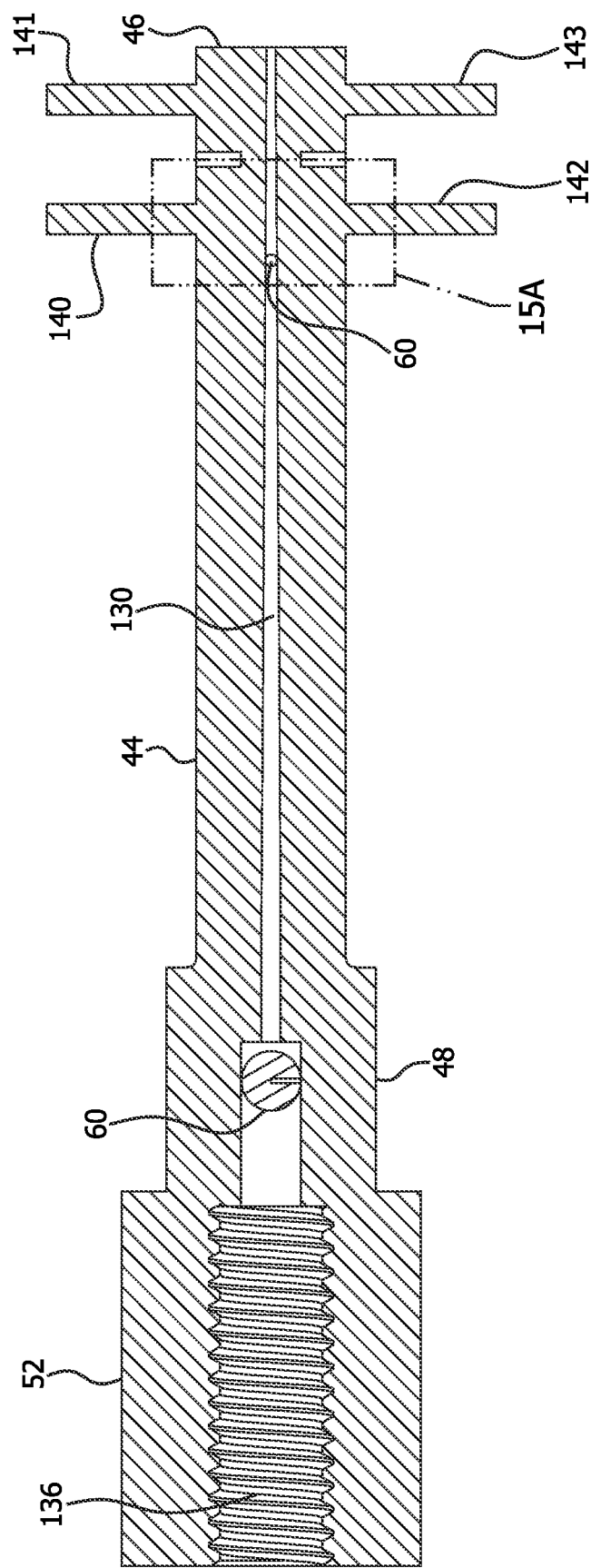
FIG. 15 is a cross section of a vacuum valve.
Figure 16:
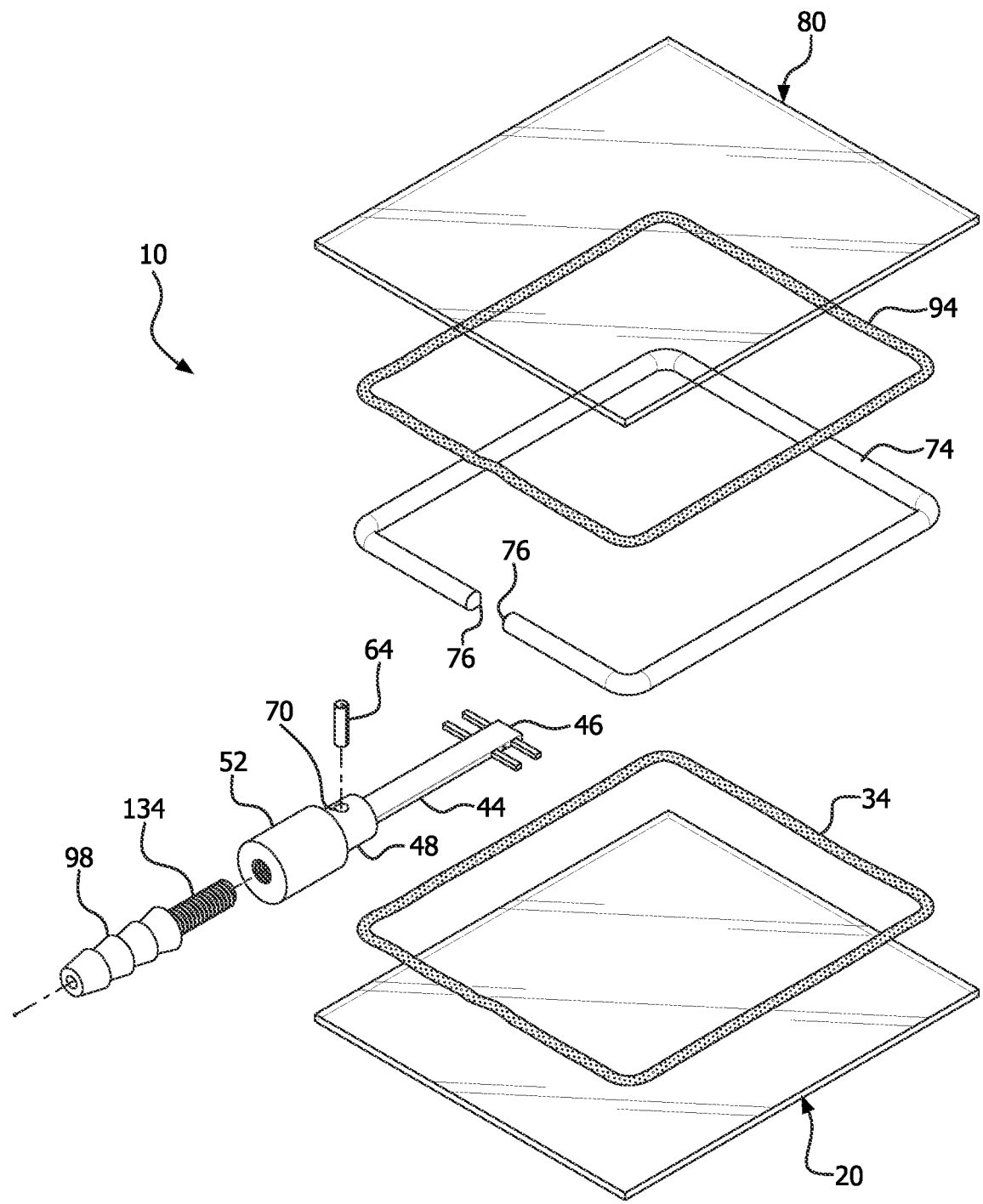
FIG. 16 is an exploded perspective view of VIG and a vacuum valve.

There is shown in FIGS. 1-16 a vacuum insulated glazing 10 and a system and method for making the same. As shown in FIG. 1, a first windowpane 20 has side edges 22, 24, 26 and 28. As shown in FIG. 2, a bead of adhesive material 34 can be placed around perimeter portions of the windowpane 20. As shown in FIG. 3, a vacuum valve 40 having first end portion 46 and opposite second end portion is provided with a valve body 44. The valve body 44 can have a restriction seat portion 48 for a restricting member 64. A suction fitting portion 52 at the second end of the valve body 44 permits attachment to a suction source (not shown). The vacuum valve can have different constructions, and can be a ball valve utilizing a spherical ball valve member 60, as shown in FIG. 4. The restricting member 64 can take various shapes, and as shown in FIG. 5 can be cylindrical and have a slot 68 or other structure to provide for an elastic and secure attachment in an appropriate seat such as the opening 70 (FIG. 16). The suction fitting portion 52 at the second end portion of the vacuum valve 40 can have suitable structures such as threaded opening 56 for attaching to a suitable suction/vacuum source.

Figure 6:
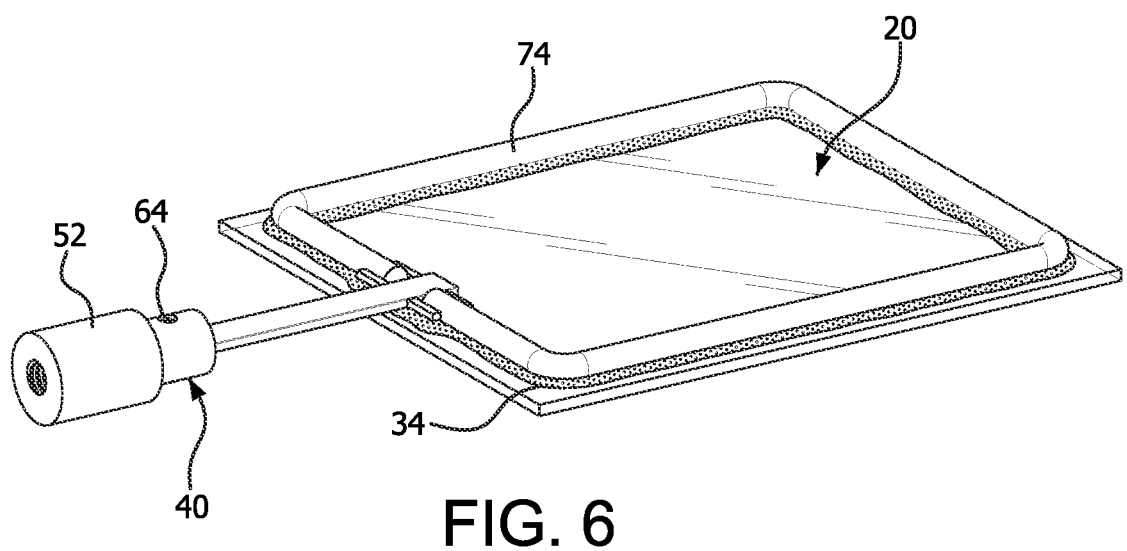
FIG. 6 is a perspective view of VIG, in a fourth stage of assembly.
Figure 7:
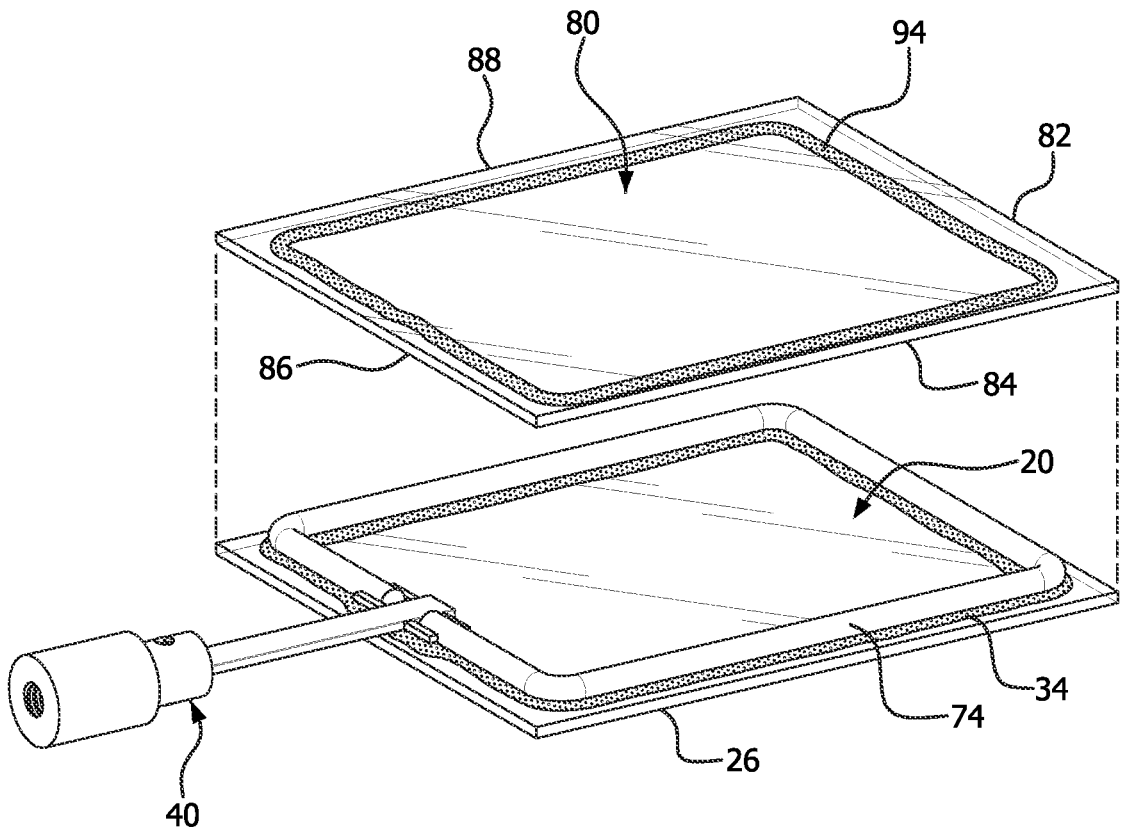
FIG. 7 is a perspective view of VIG, in a fifth stage of assembly.
Figure 8:
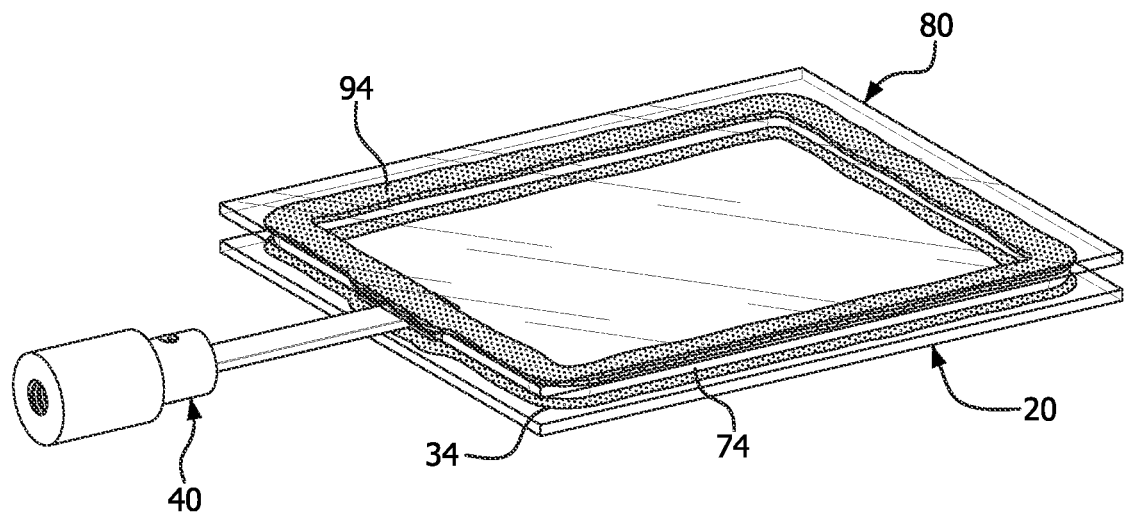
FIG. 8 is a perspective view of VIG, in a sixth stage of assembly.

As shown in FIG. 6, an edge seal in the form of a metallic barrier material 74 is placed around the perimeter portions of the windowpane 20 adjacent the adhesive material 34. The metallic barrier material 74 also create a barrier between the adhesive material 34 and the vacuum space. The vacuum space should not be exposed to adhesive material 34. The metallic barrier material 74 can be pre-shaped for this purpose. As shown in FIG. 7, a second windowpane 80 can be provided and has side edges 82, 84, 86 and 88. The bead of adhesive material 94 (shown through the windowpane 80) can be applied to underside perimeter portions of the windowpane 80 so as to engage with the edge seal material 74, as shown in FIG. 8. The bead 94 is sometimes not necessary as the adhesive material 34 can in some instances be sufficient in amount to properly adhere the windowpane 20, metallic barrier 74 and windowpane 80.

Figure 9:
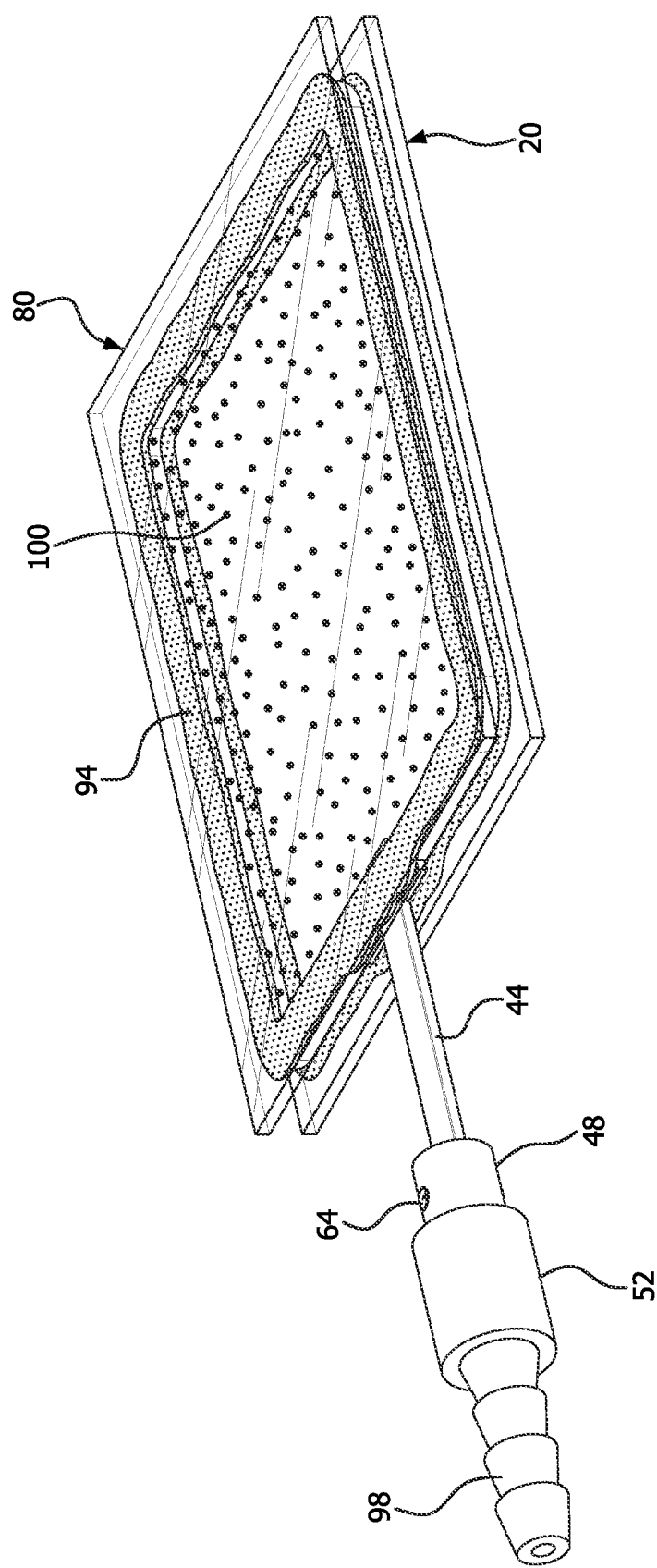
FIG. 9 is a perspective view of VIG, in a seventh stage of assembly.
Figure 10:
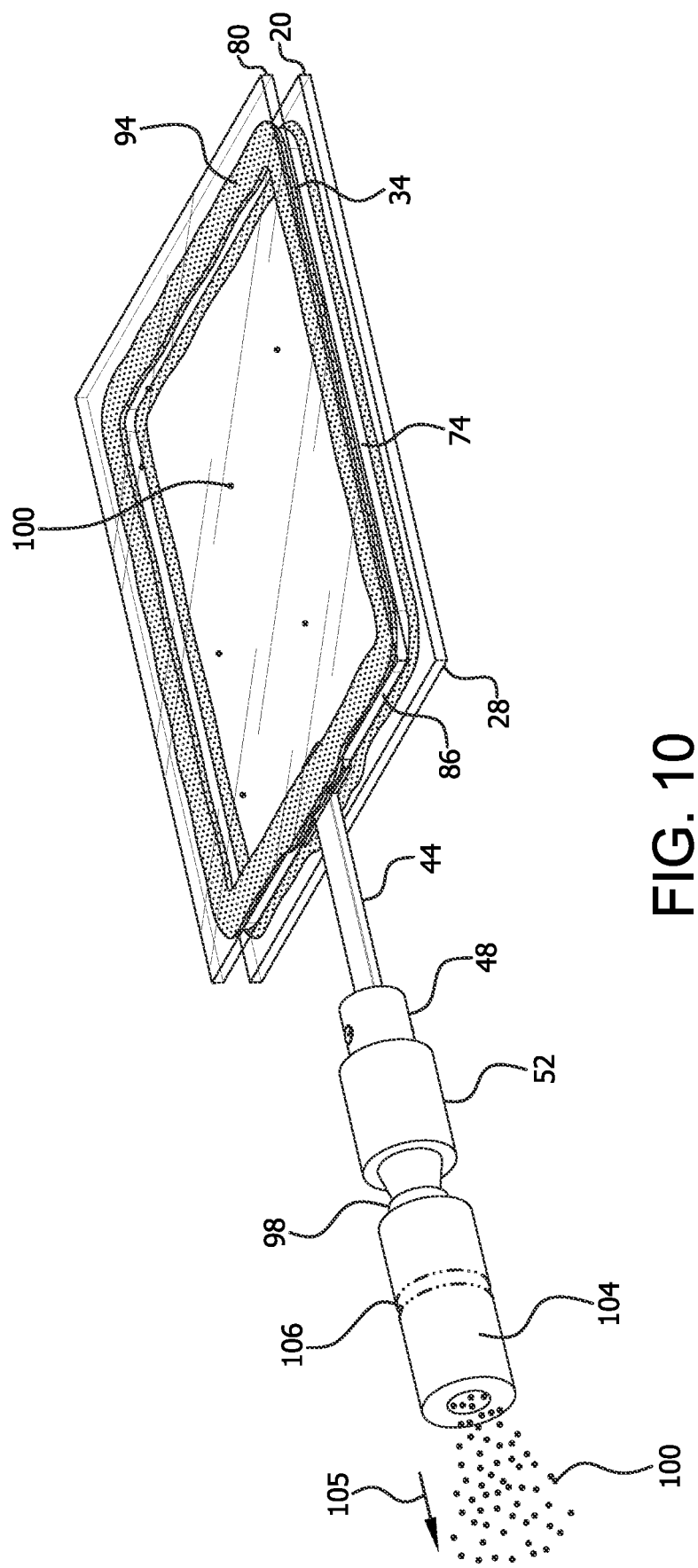
FIG. 10 is a perspective view of VIG, in an eighth stage of assembly.

The vacuum space between the windowpane 20, the windowpane 80 and the metallic barrier end material 74 is then evacuated to create a vacuum. As shown in FIG. 9, air particles 100 fill the vacuum space. A barbed fitting 98 can be secured to or form the suction fitting portion 52 for purposes of attaching a suction hose 104, which can be of indefinite length as shown by phantom break 106 (FIG. 10). A fluid conduit 130 can extend from a first end portion in communication with the vacuum space to an opposite second end portion of the valve body 44. Air 100 is withdrawn through the fluid conduit 130 from the vacuum space as indicated by arrow 105, leaving reduced air 100 in the vacuum space and creating an insulating vacuum in the vacuum space between the glass panes 20 and 80.

Figure 11:
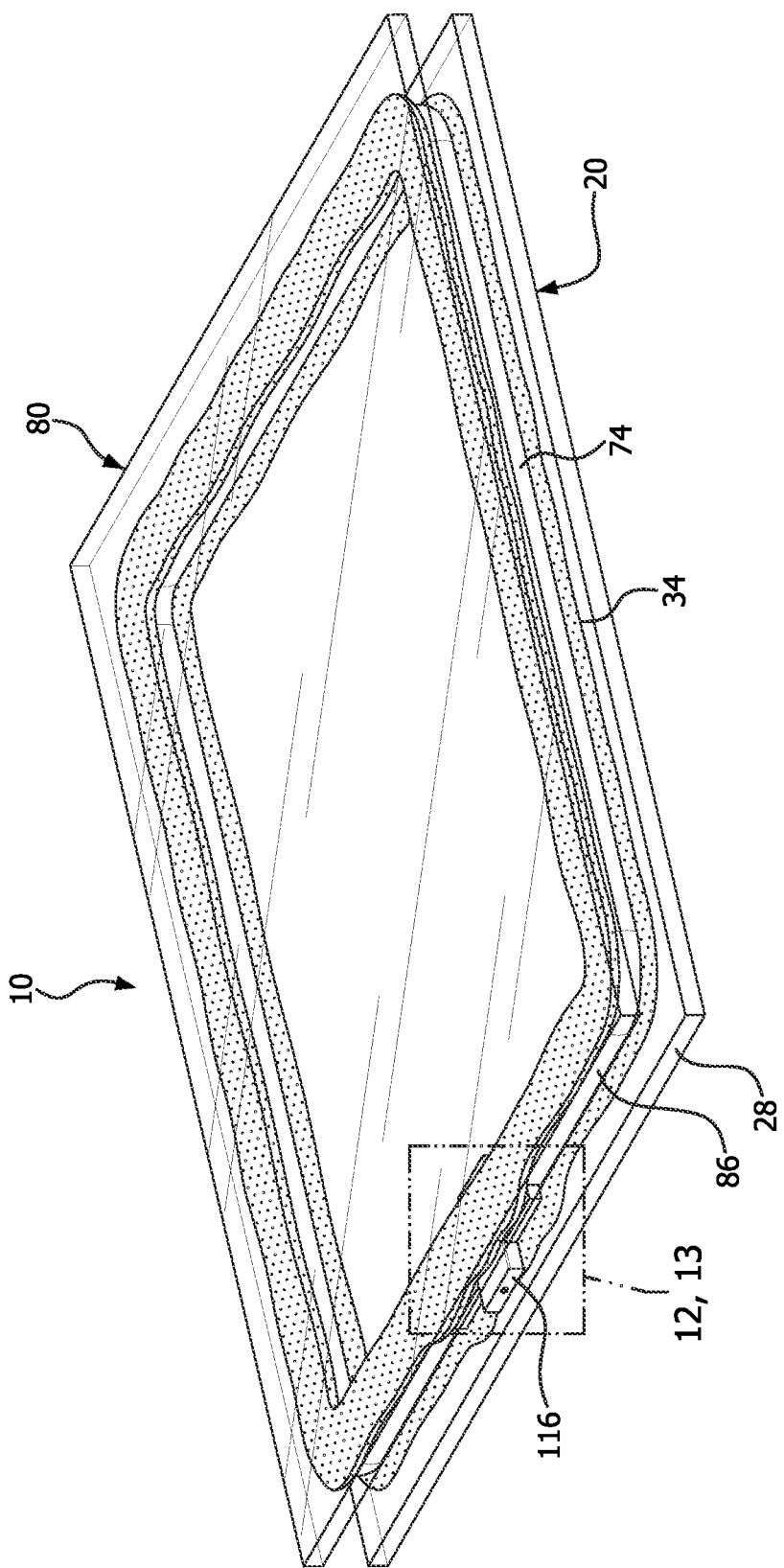
FIG. 11 is a perspective view of VIG, in a ninth stage of assembly.
Figure 12:
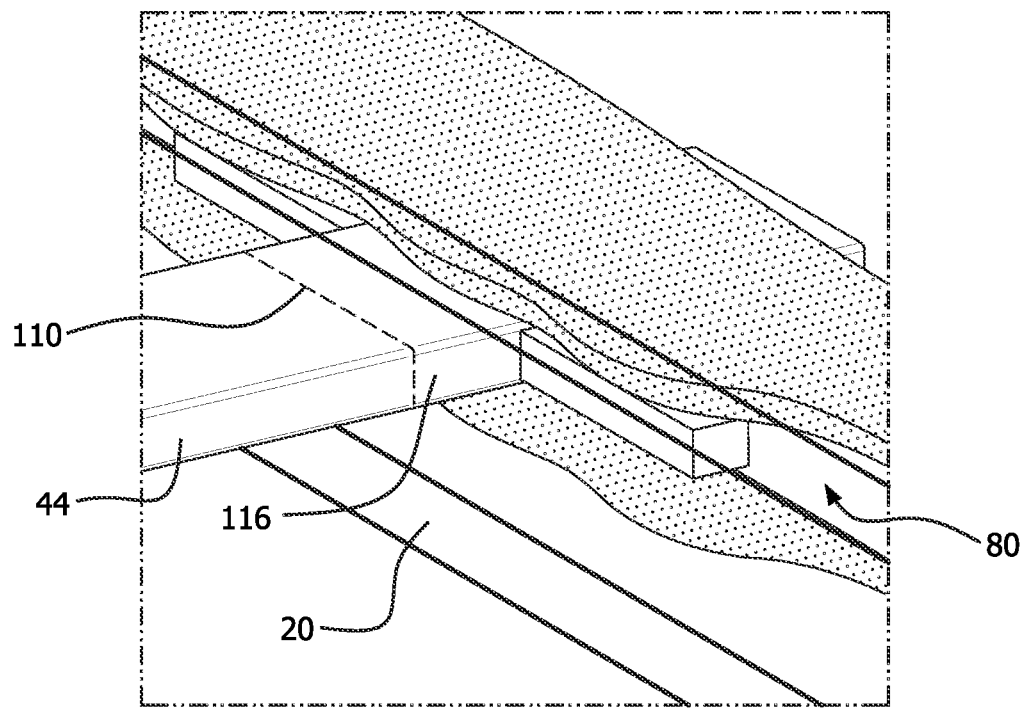
FIG. 12 is an expanded perspective view of area 12 in FIG. 11.
Figure 13:
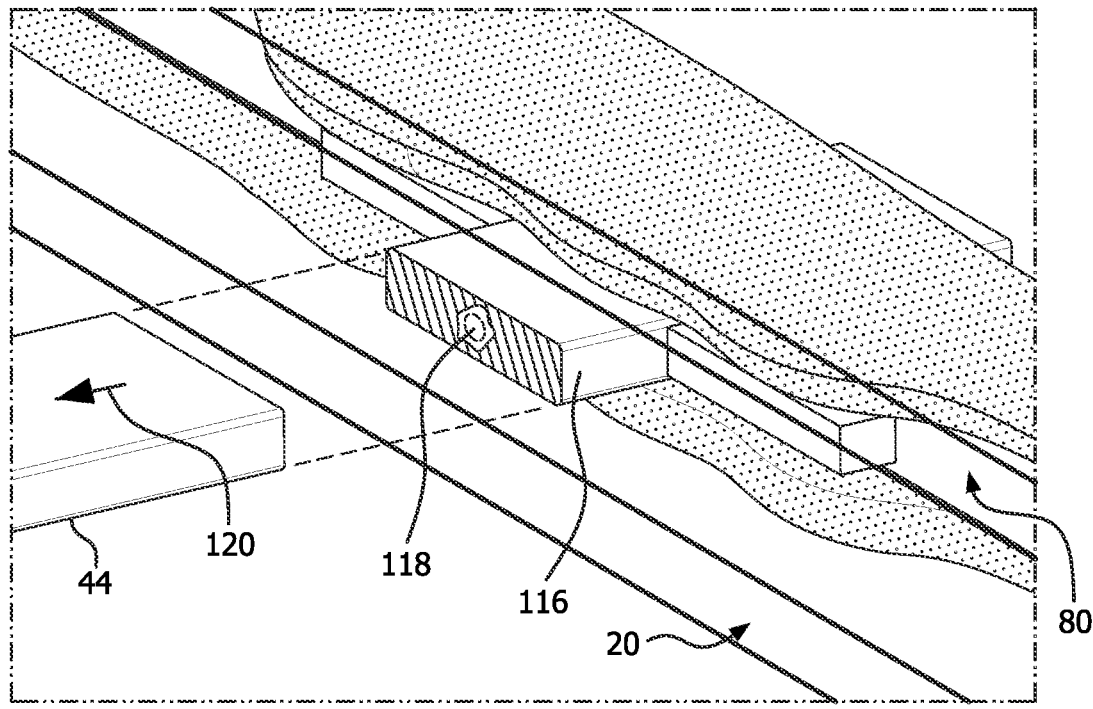
FIG. 13 is an exploded perspective view of area 13 in FIG. 11, depicting a subsequent stage of assembly.

After the vacuum has been formed in the vacuum space, the suction hose 104 is removed. A portion of the valve body 44 may protrude from the perimeter portions of the glass panes 20 and 80, such as side edges 28 and 86. Such protruding portions can be removed to facilitate the installation of the vacuum insulated glazing into a window frame. As shown in FIG. 11, after removal an end portion 116 of the valve body 44 extends a little or not at all past the side edges 28 and 86. The removal of the valve body 44 can performed by suitable structure such as a robotic saw or laser which cuts the valve body 44 at the end portion 116. A frangible portion such as a break line 110 or groove can be provided to permit snapping and removing the protruding portion of the valve body 44, as shown in FIGS. 12-13. Alternatively, the valve body 44 can be formed with detachable connections such that the protruding portion of the valve body 44 can be detached from the end portion 116 by disengaging the detachable connections. Sealing structure such as an endcap, plug or weld 118 can be used to seal the end portion to prevent the intrusion of air into the vacuum space through the end portion 116.

As shown in FIG. 14, the valve body can have an internal valve passage 130 and the plug or weld 118 can be used to seal the internal valve passage or fluid conduit 130 at the end portion 116. The suction fitting 52 and the barb portion 98 can have an in internal passage 99 which communicates with the internal valve passage 130 to permit the withdrawal of air from the vacuum space. The barb portion 98 can be secured to the suction fitting portion 52 by detachable structures such as male threads 134 and female threads 136. Other attachment structure is possible.

Figure 14A:
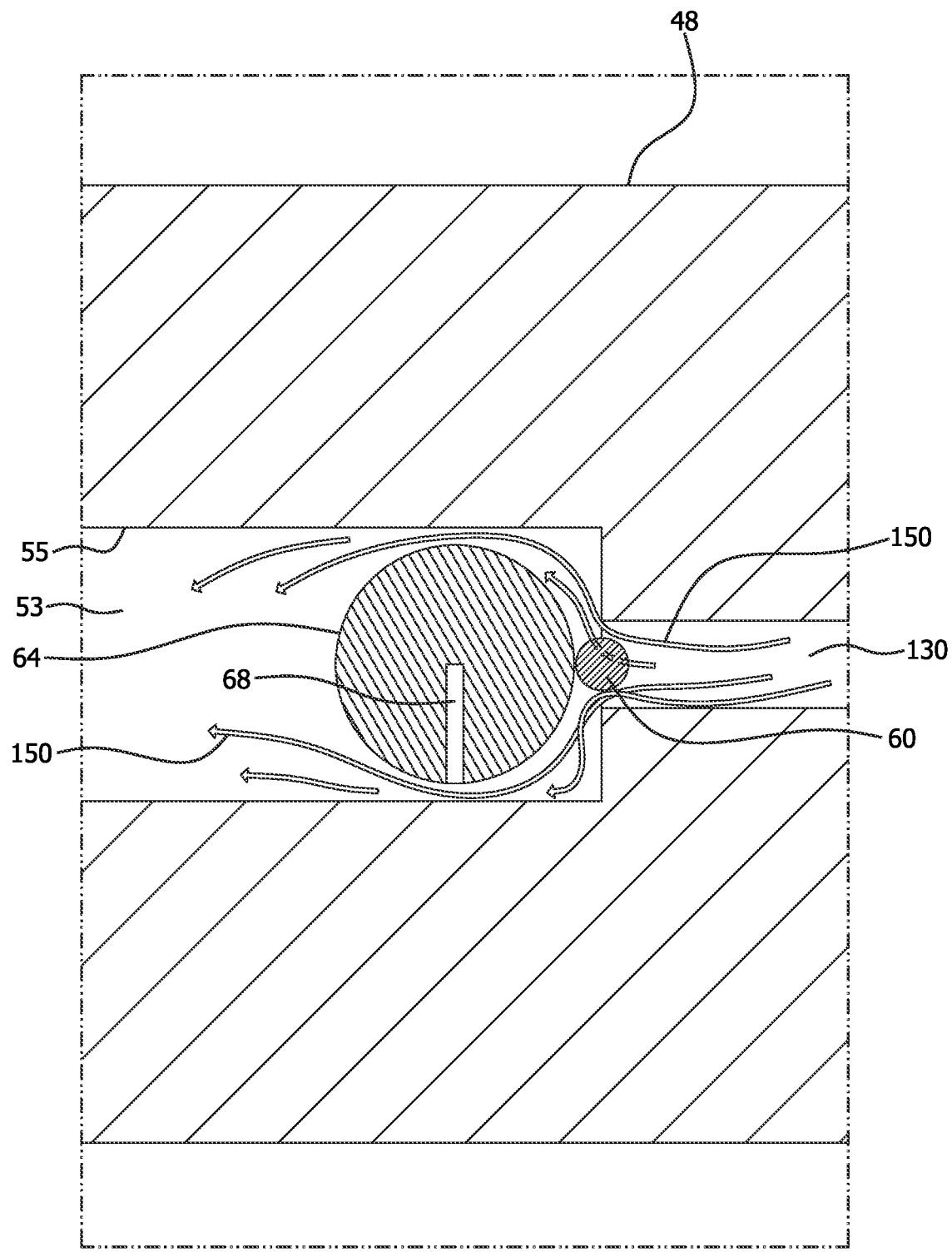
FIG. 14A is an expanded view of area 14A in FIG. 14.

As shown in FIG. 14A, the restricting member 64 when placed in the opening 70 is positioned in front of an end portion of the internal vacuum passage 130. The restricting member 64 extends through an internal opening 53 formed by walls 55 of the restriction seat portion 48. The restricting member 64 and the restriction seat portion 48 are dimensioned as shown in FIG. 14A such that upon the application of suction air will be withdrawn through the internal valve passage or fluid conduit 130 and the internal opening 53 and will flow around the restricting member 64 as shown by arrows 150. The dimensions are selected so as to permit the passage of air past the restricting member 64, but to prevent the passage of the spherical valve member ball 60, which is drawn by the suction to the end of the fluid conduit 130.

Figure 14B:
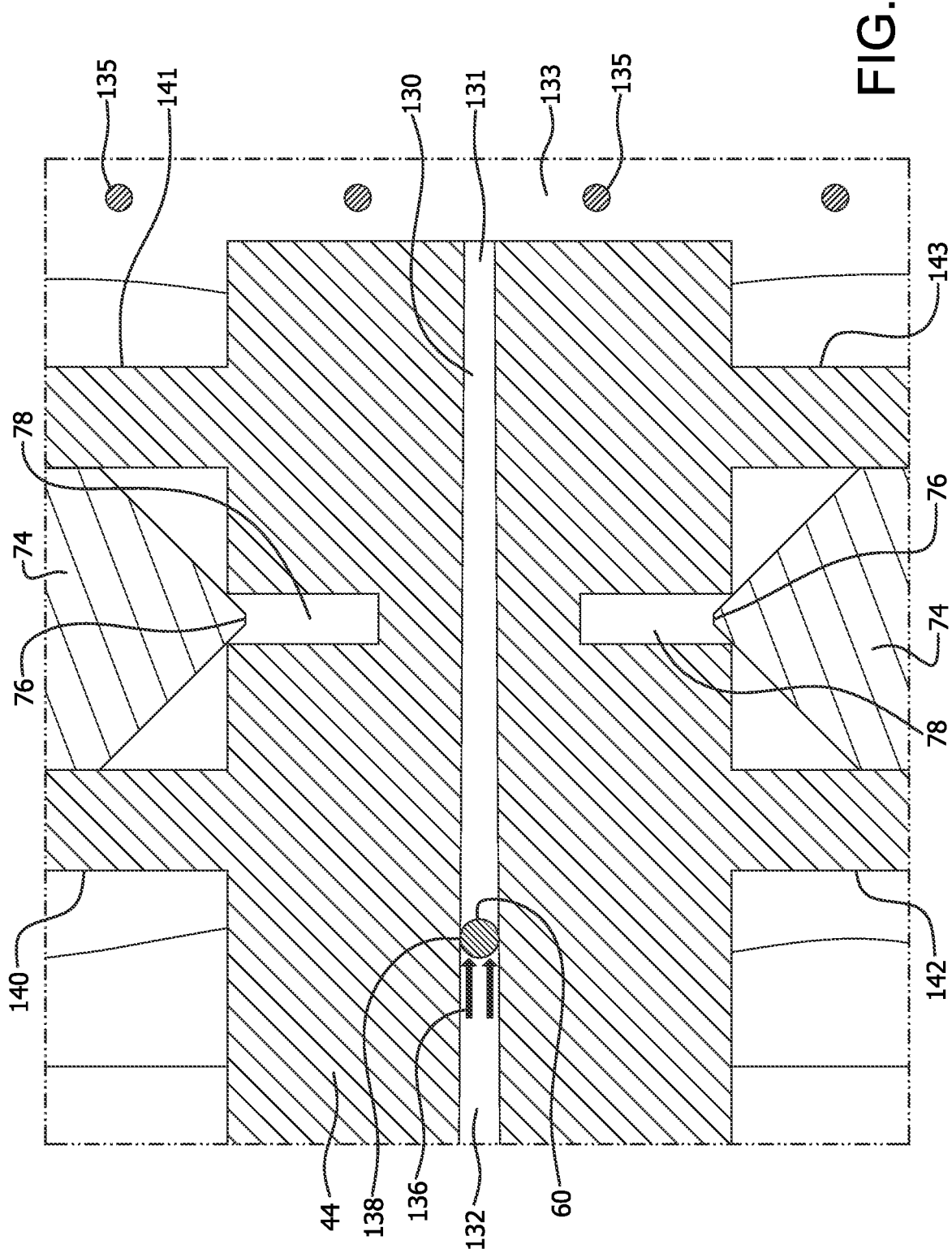
FIG. 14B is an expanded view of area 14B in FIG. 14.
Figure 15A:
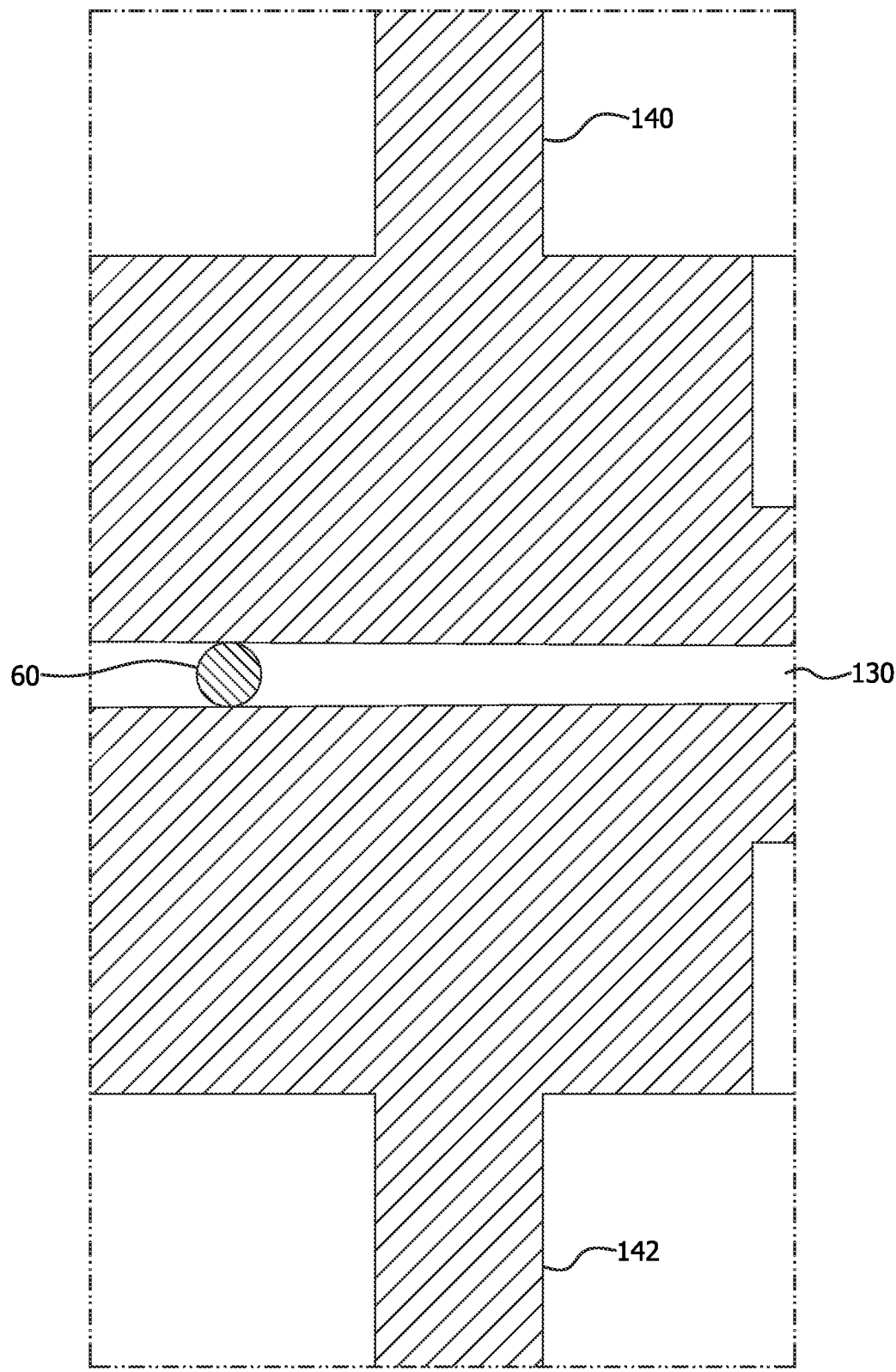
FIG. 15A is an expanded view of area 15A in FIG. 15.

The metallic barrier end seal material 74 is placed so as to create a continuous metallic barrier to retain vacuum. This step would ensure that the metal barrier 74 is created all around the perimeter space, preventing the outgassing or diffusion. This metallic barrier end seal material must be held in an appropriate position as the adhesive layers 34 and 94 cure and set. The valve body 44 can be provided with structure to secure free ends 76 of the metallic barrier end seal material. As shown in FIG. 14B and FIGS. 15-15A, protruding channel members 140, 141, 142 and 143 can be provided to position and secure the free ends 76 of the metallic barrier end seal material 74. The free ends 76 of the metallic barrier end seal material 74 can be tapered into points. The pointed free ends 76 can be received by depressions 78 formed in the valve body 44 to further secure the free ends of the metallic barrier end seal material 74 in position.

The fluid conduit 130 can have a tapering internal diameter, such as with a larger diameter at a position 132 and a smaller diameter at a position 131 adjacent the vacuum space 133 between the glass panes 20 and 80. When suction is removed, the spherical valve member ball 60 will be drawn by the vacuum of the vacuum space 133 as shown by arrows 136 to a position 138 where the diameter of the internal valve passage 130 matches the diameter of the spherical valve member ball 60 such that the spherical valve member ball 60 will close and seal the internal valve passage 130. The vacuum in the vacuum space can be quite high, below 0.001 torr. Supports such as pillars or spacers 135 can be provided between the glass panes, for example every 2", to keep the glass panes separated and free of distorting bends.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A vacuum insulated glazing, comprising:
   first and second spaced apart glass panes having perimeter portions, the glass panes defining a vacuum space between the glass panes;
   a vacuum valve positioned at the perimeter portions of the glass panes, the vacuum valve comprising:
   i) a valve body, a portion of the valve body extending between the perimeter portions of the glass panes, the valve body having first and second ends and an elongated fluid conduit having corresponding first and second ends and extending from the first end to the second end of the valve body, the first end of the fluid conduit being in fluid communication with the vacuum space, wherein the elongated fluid conduit comprises a conical portion and at the first end is smaller in cross section than at the second end;
   ii) a one-way valve in the valve body positioned between the first end and the second end of the elongated fluid conduit, the one-way valve permitting fluid flow in the fluid conduit from the first end to the second end, and preventing fluid flow from the second end to the first end of the fluid conduit, wherein the one-way valve comprises a movable valve member in the fluid conduit, the valve member having first and second positions in the fluid conduit, the valve member in the first position preventing fluid flow through the conduit, and in the second position permitting fluid flow through the conduit, wherein the valve member is a spherical ball, and further comprising a restricting member for preventing movement of the spherical ball from the fluid conduit;
   iii) a suction fitting for connecting the valve body to a suction device in fluid communication with the second end of the fluid conduit;
   a flexible metallic end seal having opposing free ends between the perimeter portions of the glass panes for non-permeability and hermetically sealing the vacuum space for increased durability, the valve body comprising channel members for receiving and securing the free ends of the end seal; and,
   whereby suction when applied to the suction fitting will draw a gas from the vacuum space through the first end of the fluid conduit, through the one-way valve and the second end of the fluid conduit to create a vacuum in the vacuum space, and the one-way valve will prevent the passage of the gas into the vacuum space so as to maintain the vacuum in the vacuum space such that the vacuum insulated glazing is capable of maintaining a vacuum of $10^{-3}$ Torr.

2. The vacuum insulated glazing of claim 1, further comprising a sealing member for attaching to the valve body and hermetically sealing the fluid conduit.

3. The vacuum insulated glazing of claim 1, wherein the valve body is rectangular in cross section and has a height dimensioned to fit between the spaced apart glass panes, the height being less than or equal to 1 mm.

4. The vacuum insulated glazing of claim 1, wherein the suction fitting is detachable from valve body.

5. The vacuum insulated glazing of claim 1, further comprising spacers extending between the glass panes and through the vacuum space.

6. A method of making a vacuum insulated glazing, comprising the steps of:
   providing first and second spaced apart glass panes having perimeter portions, the glass panes defining a vacuum space between the glass panes;
   positioning a vacuum valve at the perimeter portions of the glass panes, the vacuum valve comprising a valve body, a portion of the valve body extending between the perimeter portions of the glass panes, the valve body having first and second ends and an elongated fluid conduit having corresponding first and second ends and extending from the first end to the second end of the valve body, the first end of the fluid conduit being in fluid communication with the vacuum space, wherein the elongated fluid conduit comprises a conical portion and at the first end is smaller in cross section than at the second end; a one-way valve in the valve body positioned between the first end and the second end of the fluid conduit, the one-way valve permitting fluid flow in the fluid conduit from the first end to the second end, and preventing fluid flow from the second end to the first end of the fluid conduit, wherein the one-way valve comprises a movable valve member in the fluid conduit, the valve member having first and second positions in the fluid conduit, the valve member in the first position preventing fluid flow through the fluid conduit, and in the second position permitting fluid flow through the conduit, wherein the valve member is a spherical ball, and further comprising a restricting member for preventing movement of the spherical ball through the second end of the fluid conduit, and a suction fitting attached to the second end of the valve body for connecting the valve body to a suction device in fluid communication with the second end of the fluid conduit; and, positioning and attaching a flexible metallic end seal having opposing free ends between the perimeter portions of the glass panes to hermetically seal the vacuum space, the valve body comprising channel members for receiving and securing the free ends of the end seal;

connecting a suction source to the suction fitting and applying suction to withdraw a gas from the vacuum space through the fluid conduit to create a vacuum in the vacuum space;

ceasing the suction and removing the suction source from the suction fitting, whereby the one-way valve will prevent the flow of air through the vacuum conduit into the vacuum space such that the vacuum insulated glazing is capable of maintaining a vacuum of $10^{-3}$ Torr.

7. The method of claim 6, further comprising the step of attaching a sealing member to the valve body to hermetically seal the fluid conduit.

8. The method of claim 7, further comprising the step of removing a portion of the valve body extending beyond the perimeter portion of the glass panes prior to attaching the sealing member.

* * * * *